June 2, 1970     D. B. DRAKARD     3,514,886

FRAMES

Filed March 29, 1968     5 Sheets-Sheet 1

David Bindley Drakard
Inventor

Hall Pollock & Vande Sande
Attorneys

June 2, 1970 D. B. DRAKARD 3,514,886
FRAMES
Filed March 29, 1968 5 Sheets-Sheet 2

David Bindley Drakard
Inventor
Hall Pollock & Vande Sande
Attorneys

June 2, 1970 D. B. DRAKARD 3,514,886

FRAMES

Filed March 29, 1968 5 Sheets-Sheet 3

David Bindley Drakard
Inventor

Hall, Pollock + Vande Sande
Attorneys

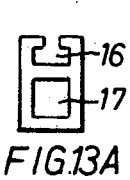
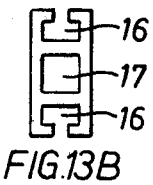
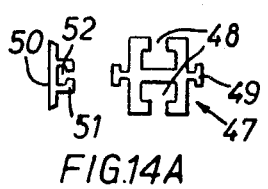
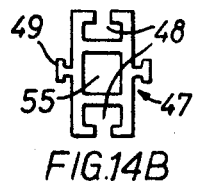
FIG.13A    FIG.13B    FIG.14A    FIG.14B
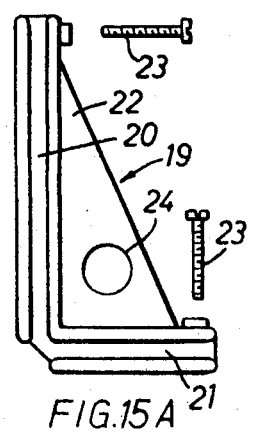
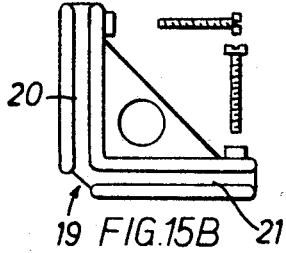
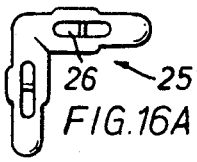
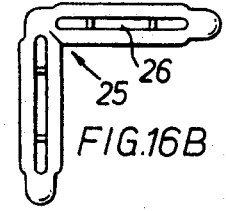
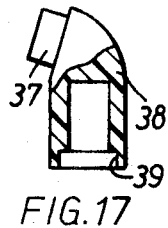
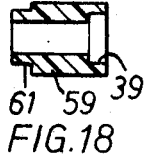
FIG.15A    FIG.15B    FIG.16A    FIG.16B    FIG.17    FIG.18
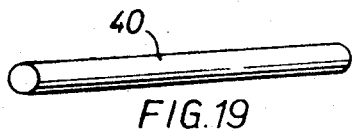
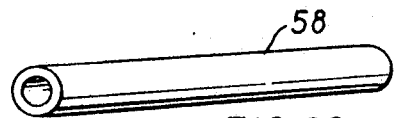
FIG.19    FIG.20
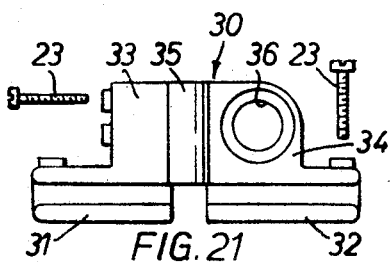
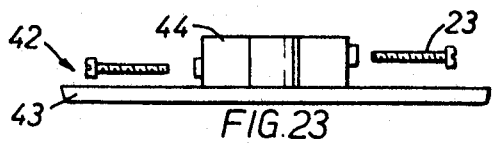
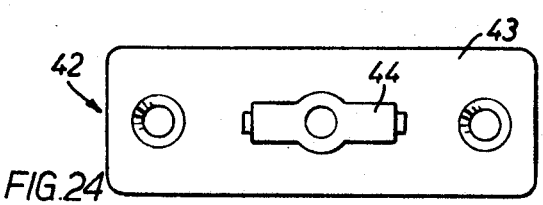
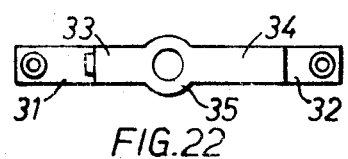
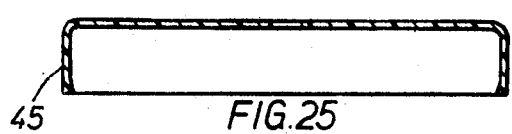
FIG.21    FIG.22    FIG.23    FIG.24    FIG.25

3,514,886
FRAMES
David B. Drakard, 25 Clarence Road, St. Albans,
Hertfordshire, England
Filed Mar. 29, 1968, Ser. No. 717,216
Claims priority, application Great Britain, Mar. 31, 1967,
14,912/67; June 5, 1967, 25,773/67
Int. Cl. G09f 1/12
U.S. Cl. 40—152.1                 11 Claims

ABSTRACT OF THE DISCLOSURE

A rectangular frame having four elongated frame members with a longitudinal slot. Two of the elongated members are of equal length and are secured to, at right angles, opposite ends of a third elongated member so as to form a three sided slot into which a flat rectangular article can be inserted. The fourth elongated member has the same length as the third elongated member and carries, at each end, a joining member for releasably joining it to the free ends of the first two elongated members.

---

This invention relates to frames for flat rectangular articles and it is an object of this invention to provide an improved frame.

According to one aspect of this invention there is provided a frame comprising first, second and third elongated members formed with a longitudinal slot, the first and second elongated members being of equal length, parallel, and secured at one end by first and second corner pieces respectively to opposite ends of, and at right angles to, the third elongated member so as to produce a three sided slot into which a flat rectangular article can be inserted, and a fourth elongated member formed with a longitudinal slot, of equal length to the third elongated member, and provided at each end with a joining member so that it can be releasably joined to the ends of the first and second elongated members to produce a rectangular frame.

The flat rectangular article may be a sign but may also be, for example, peg board, chip board, block-board, cork-faced board, slotted soft board, wall board, a saloon top or a mirror.

Alternatively the flat rectangular article may be cardboard, a photograph or a printing. In each case the width of the slot in the first, second, third and fourth elongated members is designed for the width of the flat rectangular article which is to be inserted into the slot.

In use, the flat rectangular article carried by the frame can be changed by removing the fourth elongated member, sliding the flat rectangular article out of the slot, inserting the new flat rectangular article and again joining the fourth elongated member to the ends of the first and second elongated members.

Preferably the elongated members are also formed with an undercut slot, the first and second corner pieces being shaped to fit into the undercut slot, each of the first and second corner pieces being provided with locking means for holding it in position when it is fitted into the undercut slot of one of the elongated members.

The locking means may comprise a screw.

Preferably the fourth elongated member and either the first and second corner pieces or the third elongated member or both are formed with holes so that the frame can be suspended from above by a cord, the fourth elongated member being held captive on the cord.

In one embodiment each of the elongated members of the frame is formed with two adjacent slots, the flat elongated article being intended to be inserted into the inner slot, and a transparent sheet of glass being intended to be inserted into the outer slot.

The sheet of glass which is intended to be inserted into the outer slot is, of course, also a flat rectangular article and serves in conventional manner to protect the flat rectangular article in the inner slot while allowing it to be viewed.

Suitably two longitudinal slots are provided in each elongated member so that the frame is designed to carry two flat rectangular articles visible on opposite sides of the frame.

Each elongated member of the frame may be provided with two pairs of longitudinal slots, the inner slot of each pair being intended to carry a flat rectangular article and the outer slot of each pair being intended to carry a sheet of glass.

According to a feature of this invention at least one of the elongated members of the frame is shaped to carry a light source.

In this case the elongated members may be provided with two elongated slots so that the frame is designed to carry two flat rectangular articles, the light source being intended to be disposed between the two flat rectangular articles and arranged to illuminate both of them from the rear.

Preferably the frame also comprises at least two rod holders shaped to fit into the undercut slots of the elongated members and provided with locking means for holding them in position when fitted into the undercut slot of one of the elongated members, two rods adapted to be fitted into the rod holders, and two ceiling brackets adapted to be secured to a flat horizontal surface and to which the rods may be secured.

Suitably the frame also comprises a bracing member which extends between the first and second elongated members parallel to the third elongated member and is secured thereto by corner pieces similar to the first and second corner pieces.

In this case a cord can be passed through the holes in the corner pieces (if holes are provided) which secure the bracing member to the first and second elongated members instead of being passed through the holes in the first and second corner pieces.

Suitably the frame comprises a divider member which extends away from one of the elongated members or a bracing member and is secured thereto by a corner piece similar to said first and second corner pieces, and a divider strip which is fitted to the divider so as to define therewith slots.

Suitably the frame comprises two feet which can be fitted into the holes in the corner pieces for use in supporting the frame on a flat horizontal surface.

According to another aspect of this invention there is provided a kit of parts for a frame as has been set forth, comprising first, second, third and fourth elongated members, at least two corner pieces and at least two joining members.

Alternatively the four elongated members may be replaced by a length of a readily severable material having the appropriate cross sectional shape. In this case, the four elongated members are cut by the user from the said length.

Embodiments of this invention will now be described, by way of example only, with reference to the accompanying drawings of which:

Figure 2:
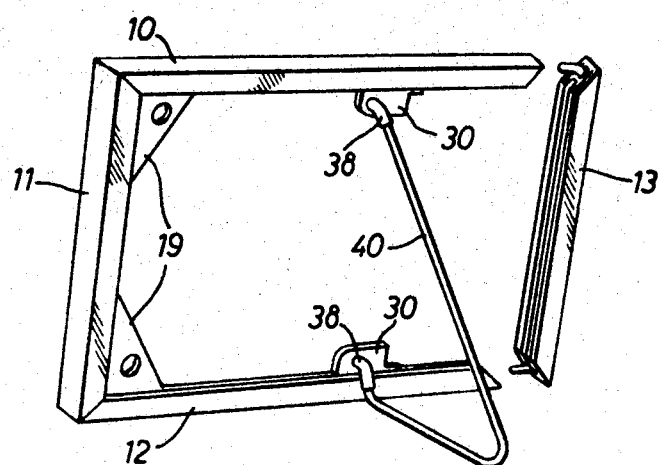
Figure 7:
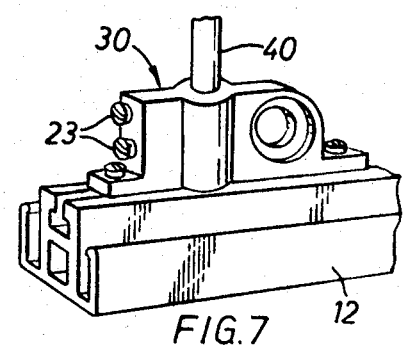
Figure 8:
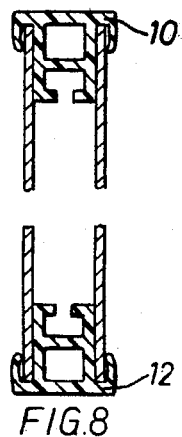
Figure 9A:
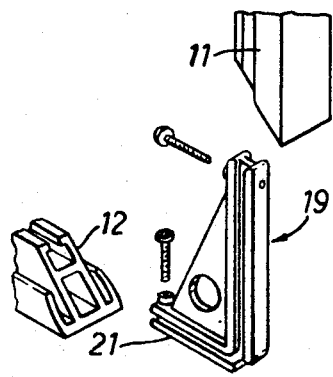
Figure 9B:
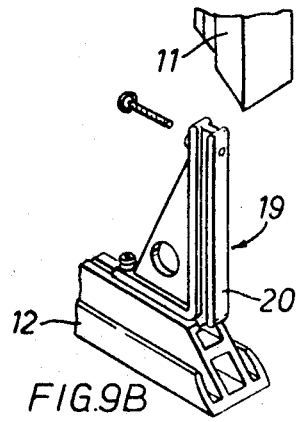
Figure 9C:
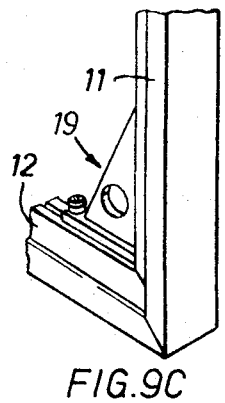
Figure 10A:
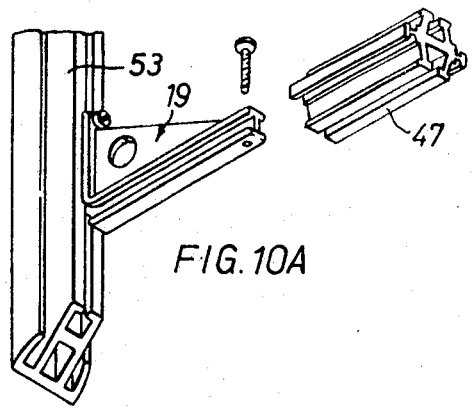
Figure 10B:
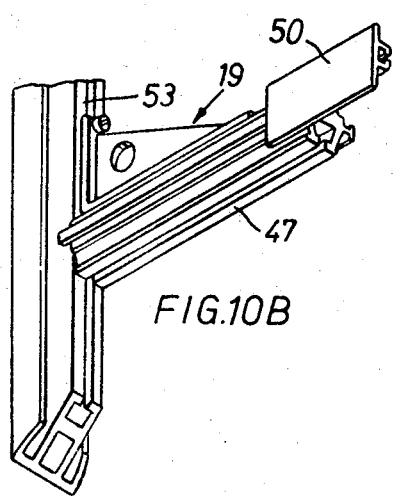
Figure 10C:
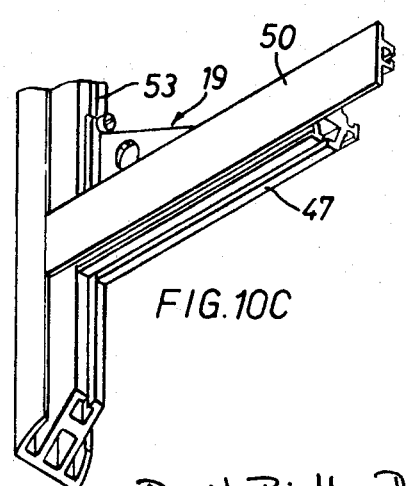
Figure 11A:
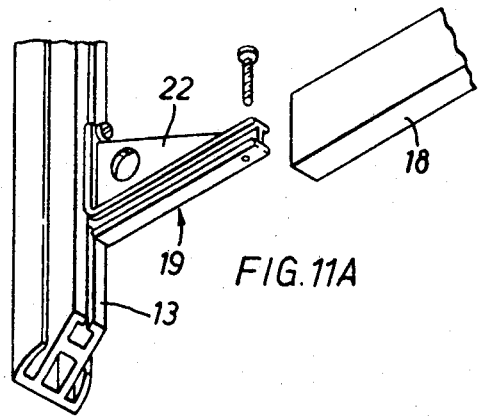
Figure 11B:
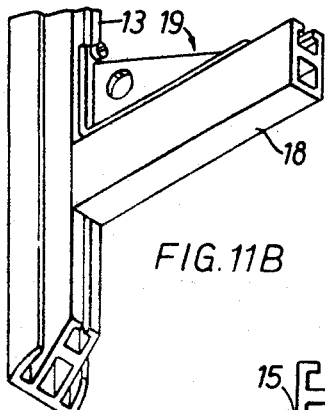
Figure 11C:
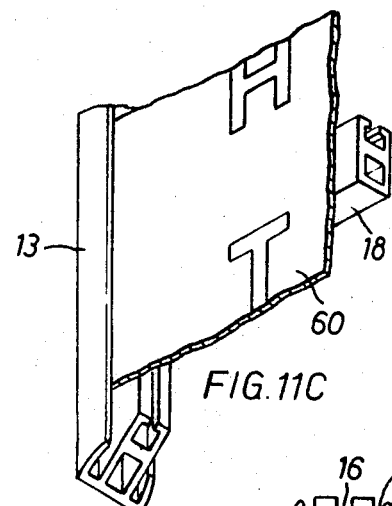

FIG. 7 shows a rod 40 secured to a rod holder 30 itself secured to a frame member 12;

FIG. 8 is a sectional view of the frame shown in FIG. 2;

FIGS. 9A to 9C illustrate how two frame members are secured together using a corner piece 19;

FIGS. 10A to 10C illustrate how a divider 47 is secured to a frame member;

FIGS. 11A to 11C illustrate how a bracing member 18 is secured to a frame member;

FIGS. 12A to 12I illustrate various alternative sections of the frame members;

FIGS. 13A and 13B show alternative sections of the bracing member 18;

FIGS. 14A and 14B show alternative sections of the divider 17;

FIGS. 15A and 15B show alternative corner pieces 19;

FIGS. 16A and 16B show alternative joining members 25;

FIG. 17 shows a foot 38;

FIG. 18 shows an extender or distance piece 59;

FIG. 19 shows a rod 40;

FIG. 20 shows a spacer 58;

FIGS. 21 and 22 are respectively a side view and a plan of a rod holder 30;

FIGS. 23 and 24 are respectively a side view and a underneath plan of a ceiling bracket 42; and FIG. 25 is a sectionol view of a cover 45.

Figure 1:
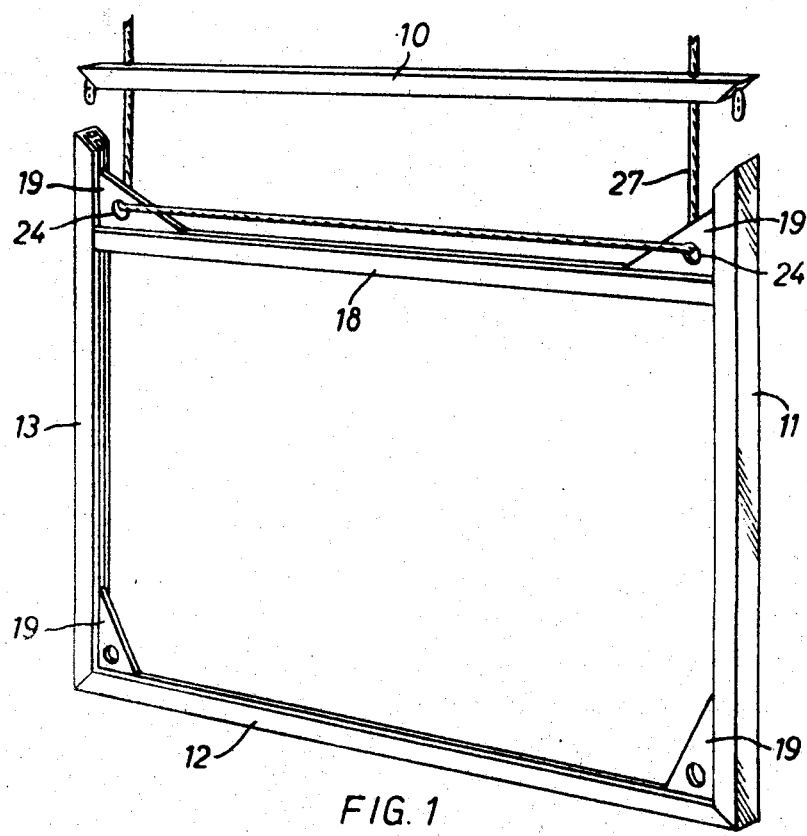
FIGS. 1 to 3 are pictorial views of three different frames embodying this invention.

Referring first to FIG. 1, a hanging frame has four elongated frame members 10, 11, 12 and 13 which are of identical section and are mitred at their ends. The four frame members 10, 11, 12 and 13 are extruded from P.V.C. or other plastics material or alternatively from anodised aluminium or other extrudable metal. The frame members 10 and 12 are horizontal and are relatively long whereas the frame members 11 and 12 are vertical and are relatively short. A sectional elevation of one of the frame members is shown in FIG. 12A where it can be seen that each frame member is formed on each side with a vertical wall 14 defining a vertical slot 15, with a central undercut slot 16 and with a rectangular tunnel 17 located beneath the slot 16 and between the slots 15.

Figure 12A:
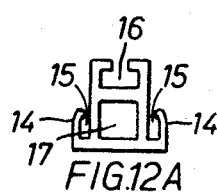

Referring again to FIG. 1, a horizontal bracing member 18 extends between the vertical frame members 11 and 13 near their upper ends and this frame member is shown in section in FIG. 13A and it will be seen that the section of this frame member is similar to that shown in FIG. 12A with the exception that the walls 14 are entirely omitted so that the slots 15 do not exist. Frame members 11 and 13 are joined at their lower ends to the member 12 by integral plastic corner pieces 19 of which one is shown in detail in FIG. 15A. Each corner piece 19 is an angle member of two arms 20 and 21 of unequal length and of I shaped section; an integral web 22 joins the arms 20 and 21. The extremities of the arms 20 and 21 are formed with threaded holes for receiving screws 23. FIGS. 9A to 9C illustrate how the frame members 11 and 12 are assembled together utilising a corner piece 19. The arm 21 is slid into the slot 16 of the frame member 12, as illustrated in FIG. 9B, and it will be seen that the central limb of the I of the arm 21 is located in the mouth of the slot 16 and the outer limb of the I in the inner wider portion of the slot 16. The screw 23 is then tightened in the threaded hole in the arm 21. The frame member 11 is then slid over the arm 20 of the joining piece 19 again so that the central limb of the I is located in the mouth of the slot 16 and the outer limb of the I is located in the inner wider portion of the slot 16 of the frame member 11. As illustrated in FIG. 9C the mitred ends of the frame members 11 and 12 meet to form a right angled corner for the frame. A screw 23 is then inserted into the threaded hole in the arm 20 and tightened. As each screw 23 is tightened its end engages the top of the tunnel 16 of the appropriate frame member and forces the inner surface of the outer limb of the I section of the appropriate arm against the inner surfaces of the inwardly extending limbs at the mouth of the slot 16 and thereby locks the croner piece 19 to the appropriate frame member. Further tightening of the screw 23 causes its end to bite in to the top of the tunnel 16 which locks the frame member and the corner piece together more securely. The bracing member 18 is secured to the frame members 11 and 13 using corner pieces 19 and the mode of securing the bracing member 18 to the frame member 13 using a corner piece 19 is illustrated in FIGS. 11A and 11B and need not be described further as it is so similar to the method illustrated in FIGS. 9A to 9C.

Each corner piece 19 has a hole 24 formed in its web 22. This hole is utilised to suspend the frame illustrated in FIG. 1 as will be explained in detail later.

The frame member 10 has inserted into its tunnel 17 at each of its ends, a joining member 25 (shown in detail in FIG. 16A) which is an integral plastics right angled member. The joining member 25 is a force fit in the tunnel 17 and is provided with voids 26 in each arm which give it resilience. The two joining members 25 are inserted into the ends of the frame member 10 and can be used to releasably secure the ends of the frame member 10 to the frame members 11 and 13 in a manner which will be obvious and need not be described. When the ends of frame member 10 is secured to the frame members 11 and 13 the mitred ends of the frame members meet to form right angled corners.

The frame is suspended by a chord 27 which passes through holes near the ends of the frame member 10 and through the holes 24 in the corner pieces 19 used to secure the bracing member 18 to the frame members 11 and 13. It will be appreciated that if the bracing member 18 is omitted the cord 27 is passed through the holes 24 in the corner pieces 19 utilised to secure the frame member 12 to the frame members 11 and 13.

If several frames are to be suspended one above the other each of the frame members 12 has holes at its ends through which the cord 27 passes the holes registering with the holes in the frame member 10. The cord 27 will in this case pass through holes 24 in corner pieces 19 of the lowest frame. Adjacent frames are maintained apart by spacers 58 (FIG. 20) which surround the cord 27 above the frame member 10 of each frame.

It will be seen that the two slots 15 in the frame members 11, 12 and 13 join together to form two continuous slots on opposite sides of the frame which extend through three sides of the triangle and into which can be fitted flat thin rectangular articles and that these articles will be held in place when the frame member 10 is joined to the frame members 11 and 13 by pushing the depending arms of the joining members 25 at each end of the frame member 10 into the tunnels 17 at the ends of the frame members 11 and 13. The member of changing a flat rectangular article will be obvious.

FIGS. 12A to 12I show various alternative cross sections of the elongated frame members (10, 11, 12 and 13) and that shown in FIG. 12A is suitable for such flat rectangular articles as a sign and such a sign (indicated at 60) is illustrated in FIG. 11C.

Figure 12I:
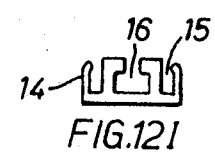
Figure 12B:
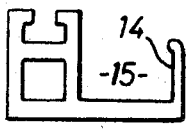

The elongated frame member shown in FIG. 12B has comparatively wide slots 15 and is suitable for such flat rectangular articles as pegboard, wallboard, hardboard, mirrorglass and the like. The elongated frame member shown in FIG. 12C has only one slot 15 which is very wide and a frame made of such elongated frame members could only support one flat rectangular article. Such a frame would be suitable for plywood, block-board for shelving, table or counter tops, soft board for use as a pin-on notice board, slotted board for interchangeable letter signs and the like.

Figures 12C, 12D:
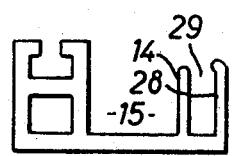

FIG. 12D shows an elongated frame member having one slot 15 which is wide and is also formed with a further wall 28 spaced from the wall 14 to define a further slot 29. The slot 29 is intended to carry a sheet of glass to cover the flat rectangular article carried in the slot 14.

Figure 12E:
Figure 12F:
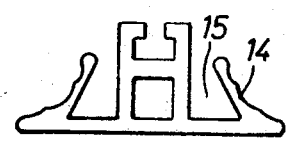
Figure 12G:
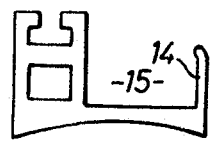
Figure 12H:
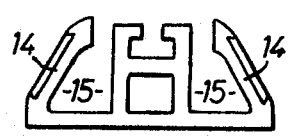

FIG. 12E shows an elongated member similar to that shown in FIG. 12A with a wall 28 adjacent to each wall 14. Thus the flat rectangular article carried in each slot 15 is protected by the glazing in the adjacent slot 29. Further variations are shown in FIGS. 12F and 12H which have resilient walls 14 for gripping the flat rectangular article tightly.

FIG. 12I shows an elongated frame member which has no tunnel 17 and when a frame is made of such elongated frame members the joining members 25 are inserted into the slot 16 instead of into the tunnel 17. In this arrangement the slots 15 are very narrow and the elongated frame member is very light. A frame made from elongated frame members as shown in FIG. 12I would be very light and suitable for light flat rectangular articles such as photographs, prints, thin cards and the like.

FIG. 2 shows a frame intended to be supported on a flat horizontal surface by a rod as will be described. In this case the left hand ends of the elongated frame members 10 and 12 are secured to the ends of the frame member 11 by means of corner pieces 19 whereas the frame member 13 carries two joining members 25 for use in removably securing it to the ends of the frame members 10 and 12.

A rod holder 30 (this element has the name rod holder for a reason which will be given later) is secured to each of the members 10 and 12 (FIG. 21 and FIG. 22). The base of the rod holder 30, which is in two parts 31 and 32, has an I shaped section which is slidable within the undercut slot 16 of each frame member in a manner similar to that in which each corner piece 19 is slidable in the slot 16 in each frame member. At each end, the base of the frame member 30 is formed with a threaded hole in which a screw 23 may be inserted and tightened to secure the rod holder 30 to a frame members at any desired point. The two parts 31 and 32 of the base of the rod holder 30 are formed with projecting webs 33 and 34 respectively which are joined by a tubular part 35 in which a rod can be inserted. The web 33 is formed with holes in which screws 23 can be inserted for rigidly securing a rod inserted in the tubular part 35. The web 34 is formed with a hole 36 into which can be fitted a projection 37 of a foot 38 (FIG. 17). The foot 38 has a recess 39 at its end into which can be fitted a rod 40 (FIG. 19) or an extender 59 (FIG. 18) which has a projection 51, which fits into the recess 39, at one end and a further recess 39 at the other end so that a number can be fitted together as a series. Projection 51 can also fit into every hole 24.

Referring again to FIG. 2 the projection 37 of a foot 38 is inserted into the hole 36 of the rod holder 30 secured to each of the members 10 and 12 and an elongated rod 40 is bent to form a back rest and its two ends are inserted into the recesses 39 of the two feet 38 so that the frame shown in FIG. 2 can be rested on a table or like flat horizontal surface. It will be seen that in the arrangement shown in FIG. 2 a rod holder 30 is secured to each of the elongated frame members 10 and 12 but the tubular parts 35 of these two rod holders 30 are not utilised at all.

FIG. 8 shows a sectional view of the frame shown in FIG. 2 which is carrying two signs 60.

Figure 3:
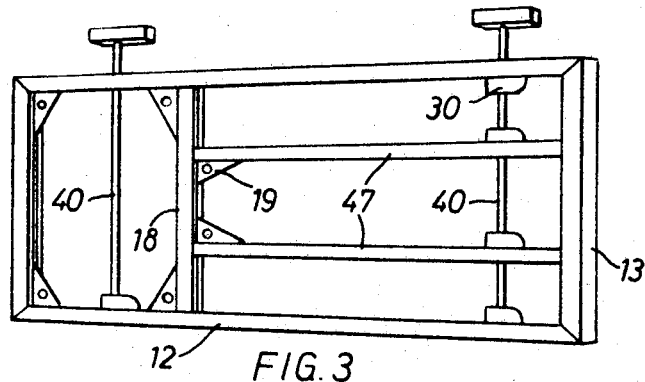
Figure 6:
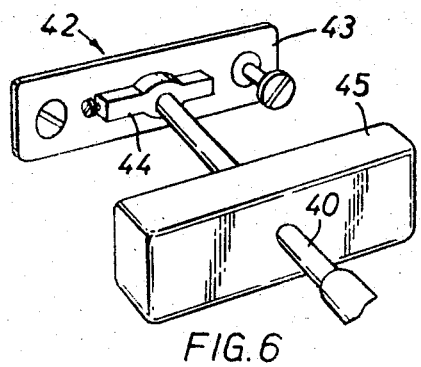
FIG. 6 shows a rod 40 secured to a ceiling bracket 42.

A frame may be suspended from a ceiling or like flat horizontal surface utilising rod holders 30 and this is illustrated in FIG. 3. In this case two rod holders 30 are secured to the lower horizontal frame member 12 and a rod 40 is inserted into the tubular part 35 of each rod holder 30 and is secured to the rod holder 30 by tightening the appropriate screw 23 is illustrated in FIG. 7. These two rods 40 extend through appropriately positioned holes in the upper horizontal frame member 10 and are suspended from ceiling brackets 42, a ceiling bracket 42 being illustrated in detail in FIGS. 23 to 25. Each ceiling bracket 42 has a flat plate 43 formed with two holes, which are utilised to hold it against a ceiling, and from this plate projects downwardly a rod holding portion 44 into which the appropriate rod 40 is inserted. This portion 44 is provided with threaded holes for screws 23. As illustrated in FIG. 6 the rod is inserted into the depending portion 44 and is held in position by the screw 23 when tightened. A cover 45 is provided with an appropriate hole so that it can be fitted over the rod 40 before it is inserted into the depending portion 44. This cover 45 is a snap fit over the bracket 42 and hides it in use.

FIG. 3 has a vertical bracing strut 18 to give it rigidity and this bracing strut has undercut slots 16 on both sides as illustrated in FIG 13B.

The portion of the frame illustrated in FIG. 3 between the bracing member 18 and the frame member 13 is divided into three portions by dividing members 47 illustrated in FIG. 14A so that three narrow flat horizontal articles can be supported by this part of the frame shown in FIG. 3.

Referring to FIG. 14A, the divider 47 consists of an elongated member having on opposite sides two undercut slots 48 similar to the slots 16 and two T-shaped projections 49 on opposite sides. Each divider 47 is provided with two divider strips 50 (only one is shown in FIG. 14A) and each divider strip 50 consists of a flat strip from which project two J shaped limbs 51 which define an undercut slot 52; each slot 52 is a close fit on each of the projections 49.

FIGS. 10A and 10B shows how such a divider 47 is secured to a vertical frame member which is indicated at 53. Referring first to FIG. 10A a corner piece 19 is first secured to the frame member 53 in the appropriate position using a screw 23 in the manner which has already been described. The divider 47 is then slid over the projecting arm (in this case arm 20) of the corner piece 19 so that the outer limb of the I shaped section of the arm 20 engages the undercut slot 48 and the divider 47 is pushed over the arm 20 until it engages the frame member 53. The two divider strips 50 are then pushed over the appropriate T-shaped projections 49 as illustrated in FIG. 10B and are pushed downwardly until they engage the projecting walls 14 of the frame member 53. Each divider strip 50 then defines with the divider 47 two slots (which are not designated) which register with the slots 15 in the elongated member 53. It will thus be appreciated that these dividers 47 serve to divide the frame so that small flat rectangular articles can be supported by the frame.

Figure 4:
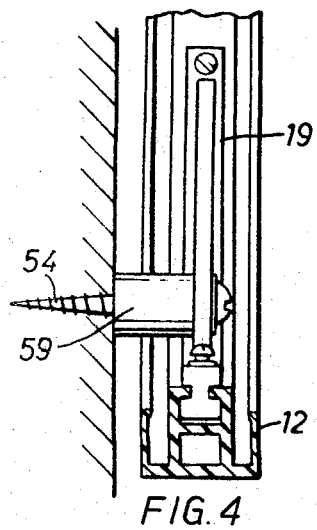
FIGS. 4 and 5 are partial sectional elevations of two further frames embodying this invention.

Referring to FIG. 4 a frame in accordance with this invention can be held against a flat wall by means of screws 54 which pass through the holes 24 in the corner pieces 19 and in this case the screws 54 are surrounded by distance pieces 59 so that the frame is held at the required distance from the wall.

Figure 5:
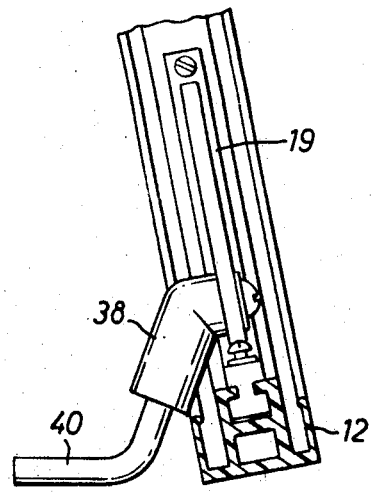

Referring now to FIG. 5 a frame may be supported on a flat horizontal surface by inserting the projections 37 of two feet 38 into the holes 24 in the corner pieces adjacent to the lower horizontal frame member 12. A short appropriately shaped length of rod 40 is then inserted into the recess 39 so that the feet 38 together with the rods 40 can support a frame on a table or other horizontal surface.

An alternative form of corner piece 19 is shown in FIG. 15B and this corner piece 19 only differs from that shown in FIG. 15A in that the arms 20 and 21 are of equal length. This corner piece is suitable for applications where the frame must be small.

FIG. 16B shows a joining member 25 which only differs from that shown in FIG. 16A in that the length of its arms is greater and they are provided with larger voids 26. This joining member 25 is suitable for use with frames with long frame members.

FIG. 14B shows a divider 47 which differs from that shown in FIG. 14A in that it is provided with a central tunnel 55. The tunnel 55 has no function other than to provide the divider 47 with rigidity and such a divider is suitable for use in a long frame.

All the various components of elongated form which have been described are made from extrudable plastics material such as P.V.C. or an extrudable metal such as aluminium. The joining members 25 are moulded from hard polythene. The other small parts such as the corner pieces 19 are moulded from a plastics material such as A.B. styrene or pressure die cast using a suitable metal.

It is intended that the frames should be sold in the form of a kit of parts consisting of lengths of elongated frame members of any of the illustrated forms, long rods 40, lengths of spacer 58, a number of corner pieces 19 of either form, a number of joining members 25 of either form, lengths of divider 47 of either form, lengths of bracing members 18 of either form, a number of rod holders 30, a number of feet 38, a number of extenders 59, and a number of ceiling brackets 42.

The user will cut the frame members 10, 11, 12, and 13 from the lengths as required and similarly will cut the dividers 47, the bracing members 18, the spacers 58, and the rods 40 as required.

I claim:

1. A frame comprising first, second, third and fourth elongated members formed with a longitudinal slot, first and second corner pieces, and first and second corner members, said first and second elongated members being of equal length, parallel, and secured at one end by said first and second corner pieces respectively to opposite ends of, and at right angles to, said third elongated member so as to produce a three sided slot into which a flat rectangular article can be inserted, said fourth elongated member having the same length as said third elongated member so that it can be releasably joined to the ends of said first and second elongated members to produce a rectangular frame, said elongated members also being formed with an undercut slot, the first and second corner pieces being shaped to fit into said undercut slot, each of the first and second corner pieces being provided with locking means for holding it in position when fitted into the undercut slot of one of the elongated members, at least two rod holders shaped to fit into the undercut slots of the elongated members and provided with locking means for holding them in position when fitted into the undercut slot of one of the elongated members, two rods adapted to be fitted into the rod holders, and two ceiling brackets adapted to be secured to a flat horizontal surface and to which the rods may be secured.

2. A frame comprising first, second, third and fourth elongated members formed with a longitudinal slot, first and second corner pieces, and first and second corner members, said first and second elongated members being of equal length, parallel, and secured at one end by said first and second corner pieces respectively to opposite ends of, and at right angles to, said third elongated member so as to produce a three sided slot into which a flat rectangular article can be inserted, said fourth elongated member having the same length as said third elongated member, and carrying, at each end, one of the joining members so that it can be releasably joined to the ends of said first and second elongated members to produce a rectangular frame, said fourth elongated member and a member of the group consisting of the first and second corner pieces and of the third elongated member being formed with holes so that the frame can be suspended from above by a cord, said fourth elongated member being held captive on the cord, and two feet which can be fitted into the holes in the corner pieces for use in supporting the frame on a flat horizontal surface.

3. A frame comprising first, second, third and fourth elongated members formed with a longitudinal slot, first and second corner pieces, and first and second corner members, said first and second elongated members being of equal length, parallel, and secured at one end by said first and second corner pieces respectively to opposite ends of, and at right angles to, said third elongated member so as to produce a three sided slot into which a flat rectangular article can be inserted, said fourth elongated member having the same length as said third elongated member, and carrying, at each end, one of the joining members so that it can be releasably joined to the ends of said first and second elongated members to produce a rectangular frame, a bracing member which extends between said first and second elongated members parallel to said third elongated member, and corner pieces similar to said first and second corner pieces for securing said bracing member to said first and second elongated members.

4. A frame as claimed in claim 3 which comprises a divider member which extends away from a member of the group consisting of the elongated members and the bracing member, a corner piece similar to said first and second corner pieces which secures said divider member to said member of the group, and a divider strip which is fitted to the divider so as to define therewith slots.

5. A frame comprising four elongated frame members disposed to form a rectangle, each said member having a pair of longitudinal slots extending inwardly of the frame to define peripheral channels for receiving the margins of flat rectangular articles to be displayed on opposite sides of the frame, two of said members opposite and parallel to one another having longitudinal tunnels extending therethrough, two corner gusset members each of which has right angled edges, said gusset members respectively connecting adjacent ends of said two opposite members to opposite ends of a third one of said members by interlocking engagement of the adjacent right angled edges of each gusset member with the adjoining frame members at locations disposed between said slots and, in the case of said two opposite members, locations spaced from said tunnels, and means releasably engaged in the tunnels of said two opposite members for retaining the fourth one of said members in attached relation to the other ends of said two opposite members.

6. A frame as claimed in claim 5, in which the four members are all extruded and of identical cross section.

7. A frame as claimed in claim 6, in which the said fourth member is attached to said two opposite members by two right angled L-shaped members the limbs of which engage respectively in the tunnel of the said fourth member and the tunnels of said opposite members.

8. A frame as claimed in claim 6, in which each extruded section comprises an undercut longitudinal groove disposed between said pair of longitudinal slots, the right angled edges of said gusset members having the shape of undercut tongues for engagement in said grooves and each being provided with locking means for securing it in said groove.

9. A frame as claimed in claim 8 which also comprises at least two rod holders shaped to fit into the undercut slots of the elongated members and provided with locking means for holding them in position when fitted into the undercut slot of one of the elongated members, two rods adapted to be fitted into the rod holders, and two ceiling brackets adapted to be secured to a flat horizontal surface and to which the rods may be secured.

10. A frame as claimed in claim 5 which also comprises a bracing member extending between the said two opposite elongated members parallel to the third elongated member, and further corner gusset members similar to said two corner gusset members for securing said bracing member to the said two opposite members.

11. A frame as claimed in claim 10 which comprises a divider member which extends away from a member of the group consisting of the elongated members and the bracing member, an additional corner gusset member similar to said two corner gusset members for securing said divider member to said member of the group, and divider strips fitted to said divider member on each side to define therewith pairs of slots registering with those of the frame.

References Cited

UNITED STATES PATENTS

| | | | |
|---|---|---|---|
| 1,053,114 | 2/1913 | Seaberg | 40—155 |
| 1,395,853 | 11/1921 | Marriott | 40—133 |
| 2,155,936 | 4/1939 | Fuller | 40—133 |
| 2,581,843 | 1/1952 | Edwards | 40—155 |
| 2,839,857 | 6/1958 | Teller | 40—64 |
| 2,954,630 | 10/1960 | Hull | 40—152.1 |

FOREIGN PATENTS 836,597   4/1952   Germany.

EUGENE R. CAPOZIO, Primary Examiner

W. J. CONTRERAS, Assistant Examiner

U.S. Cl. X.R.

40—155